Aug. 16, 1932. W. C. MERCIER 1,872,164
REAR WINDOW SHADE FOR AUTOMOBILES
Filed March 7, 1927
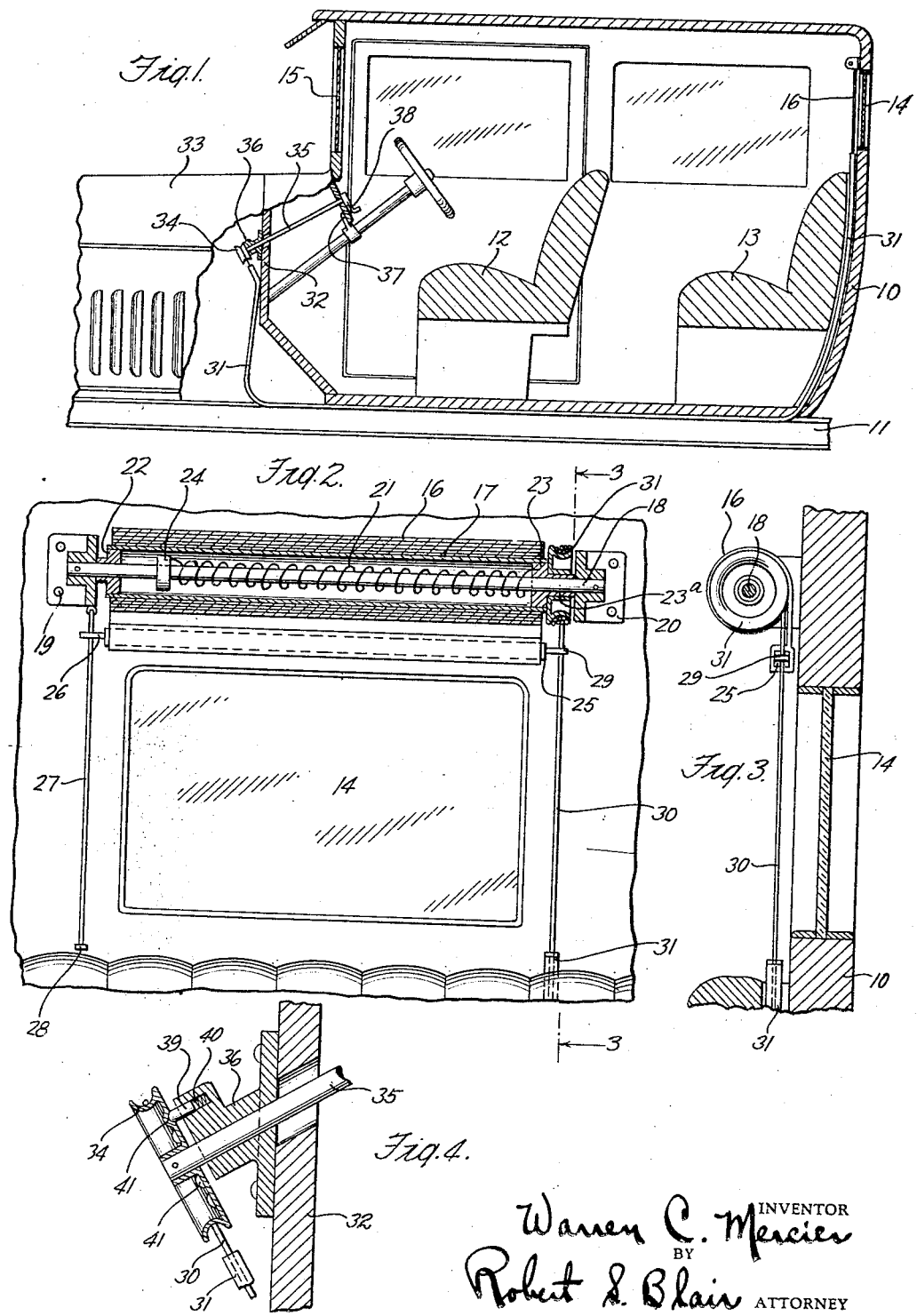

Patented Aug. 16, 1932

1,872,164

UNITED STATES PATENT OFFICE

WARREN C. MERCIER, OF DANBURY, CONNECTICUT

REAR WINDOW SHADE FOR AUTOMOBILES

Application filed March 7, 1927. Serial No. 173,358.

This invention relates to rear window shades for automobiles. One of the objects thereof is to provide a device of the above nature which is highly efficient. Another object is to provide a device of the above nature which is conveniently operated. Another object is to provide a device of the above nature which is controlled with ease from the driver's seat. Another object is to provide a device of the above nature which is simple and inexpensive and readily adapted for application to the various makes and styles of automobiles. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claim.

In the accompanying drawing, in which is shown one of the various possible embodiments of this invention, Figure 1 is a sectional view of an automobile body showing somewhat diagrammatically a rear window shade and its control;

Fig. 2 is a front view of the rear window with the shade and its support shown partly in section;

Fig. 3 is a view taken as indicated by the section line 3—3 of Fig. 2; and

Fig. 4 is a sectional view of parts of the control.

Similar reference characters refer to similar parts throughout the several views of the drawing.

As conducive to a clearer understanding of the features of this invention, it may be here pointed out that, when driving an automobile at night, the headlights of a car following in the rear are a source of continual annoyance to the driver and, in addition, give rise to a real danger. If the light from the car in the rear shines through the rear window of the forward car, it generally falls full upon the windshield and greatly hampers the vision of the driver. The reflected light glaring in the eyes of the driver often renders it practically impossible to see through the windshield.

It is therefore desirable that the rear window be provided with a curtain or shade to cut off this glaring light. However, a shade of this nature is of little use unless it is capable of being raised and lowered conveniently, and particularly in cars of the closed type. The shade, when it is lowered or operative, cuts off the driver's view to the rear and must be removed from in front of the window if the driver wishes to scan the traffic in back before making a turn or coming to a stop, or if he wishes to back up. In cars of the sedan or coach types, the shade is not within reach of the driver or other occupant of the front seat, and it is extremely aggravating to be unable to raise or lower the shade without climbing into the back of the car to do it. It is one of the dominant aims of this invention to provide a shade which overcomes these disadvantages in a simple and thoroughly practical manner.

Referring now to Fig. 1 of the drawing in detail, there is shown an automobile body 10 mounted upon a frame or chassis 11 and having a front seat 12 and a rear seat 13. This body is of the closed type and is provided with a rear window 14 which, as will be seen, is substantially on a level with the windshield 15 thereby permitting the glaring light from the headlights of a car in the rear to strike the windshield in front of the driver.

The window 14 is provided with a shade 16 which is preferably mounted upon a roller 17 (Fig. 2) for movement into and out of operative position over the window. The roller 17 is mounted on the inner side of the body above the window and, in the embodiment here shown, it is hollow and rotatably carried upon the shaft or rod 18. The rod 18 is supported at its ends in brackets 19 and 20 secured to the body.

Within the roller 17 is a spring 21 which tends continually to rotate the roller about the rod 18 in a direction to roll up the shade 16 and remove it from in front of the window. The hollow roller has fixed in its two ends a pair of bushings 22 and 23 which are rotatable upon the rod 18. The spring 21 is preferably coiled about the rod 18 and is suitably tensioned by being connected to the rod at one end 24 and to the bushing 23 at the other end.

The curtain has secured therein at its lower end a suitable stick or rod 25 which may be weighted if found desirable so that the shade will fall into extended position over the window when the roller 17 is rotated to unwind it. Projecting from the left-hand end of the stick 25, as viewed in Fig. 2, is an eye 26 which encircles a cord or wire 27 the upper end of which may be fastened to the bracket 19 and the lower end of which is suitably fastened to the body as at 28.

Projecting from the right-hand end of the stick 25 is an eye 29 similar to the eye 26. Through this eye 29 passes a cord or wire 30 which extends substantially parallel to the cord or wire 27. Preferably the member 30 is a flexible metallic wire member and at its upper end it is secured to the surface of a pulley 31. This pulley 31 is fixed upon a hub 23ᵃ of the bushing 23 and hence, when the pulley rotates, the roller 17 rotates therewith to extend or withdraw the shade 16. In the position of the parts shown in Figs. 2 and 3, the shade is rolled up and the wire 30 is coiled about the pulley 31 a number of times. By pulling downwardly upon the wire 30, the wire is uncoiled from the pulley 31 and the roller 17 is rotated with the pulley in a direction to unroll the shade and extend it in front of the window. As the shade moves downwardly or upwardly its lower end is guided by the members 27 and 30 and, when the shade is extended, these parts, cooperating with the eyes 26 and 29, hold the shade against flapping.

As seen in Figs. 2 and 3, the flexible wire 30 enters a small tube or pipe 31 projecting upwardly from in back of the rear seat back. Referring now to Fig. 1, this pipe 31 extends downwardly from adjacent the window 14 and thence forwardly along the body, preferably beneath the floor-boards, running, for example, along the edge of the frame 11. The forward end portion of the pipe 31 curves upwardly adjacent to the dash 32 and terminates in front of the dash beneath the hood 33. The pipe 31 is of an inner diameter to slidably receive the wire 30, and the wire extends therethrough and projects from the forward end of the pipe or tube, where its end is secured to the surface of a pulley 34. This pulley 34 is positioned in front of the dash 32 beneath the engine hood of the automobile and is fixed upon a shaft 35. The shaft 35 has a bearing support 36 upon the dash 32 and extends upwardly and rearwardly through the dash and through the instrument board 37 in which it has a second bearing. On the outer end of the shaft 35, and thus positioned on the outer surface of the instrument board 37 within convenient reach of the driver, is fixed a small crank 38 by means of which the shaft 35, and hence the pulley 34, may be rotated.

With the parts positioned as shown in the drawing, when the crank 38 is rotated, the wire 30 is drawn forwardly through the tube 31 and coiled upon the pulley 34. This effects uncoiling of the wire from the pulley 31 upon the shade roller and rotates the roller to unroll and move the shade into operative position over the window. When the crank is now turned in the opposite direction, the spring 21 rolls the shade up.

The spring 21 keeps the wire 30 always under tension and tends to turn the shaft 35 and the crank 38 in a direction to roll up the shade. In order to hold the shade in extended or operative position against the action of the spring suitable means is provided for yieldingly holding the shaft 35 against rotation. Referring to Fig. 4, this means preferably takes the form of a spring-pressed detent consisting of a plunger 39 mounted in a recess in the bearing bracket 36 and urged outwardly by a spring 40 against the rear surface of the pulley 34. In the rear surface of the pulley are provided a plurality of pressed recesses 41 for cooperation with the end of the plunger 39. Thus the crank 38 may be turned to position the shade in any desired position either fully unrolled or partly unrolled, and the detent 39 yieldingly holds the shade in such position against the action of the spring.

From the foregoing, it will be seen that there is herein provided a construction which achieves the objects of this invention and accomplishes results of real practical value. The crank 38 is positioned upon the instrument board within convenient reach of the driver and he may thus raise or lower the rear shade with ease whenever desirable. The pulley 34 is preferably of substantially greater diameter than the pulley 31 so that simply one or two turns of the crank 38 rotates the roller 17 a number of times, whereby a comparatively slight turning of the crank is required to move the shade into and out of operative position. The pipe or tube 31 is preferably of an easily bendable material so that it may be led along the body or frame of the automobile by the most convenient route. Regardless of the bends or twists in the tubing, the flexible wire will always slide therethrough smoothly and easily.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

In a device of the character described, a roller adapted to be mounted above the rear window of an automobile, a window shade on said roller adapted to move into and out of operative position over the window, a spring tending to turn said roller to roll up said shade, a pulley on said roller at one end thereof, a flexible wire connected to rotate said pulley against the opposition of said spring and extending downwardly therefrom substantially parallel with the side of the window, a tube adapted to maintain said wire in said position and to conduct an extension thereof to a position near the driver's seat, means on said shade adapted to be guided along said wire, a second pulley to which the forward end of said wire is connected, means for retaining said second pulley in fixed position, and means operable from the driver's seat for rotating said second pulley to operate said shade.

In testimony whereof, I have signed my name to this specification this 2nd day of March, 1927.

WARREN C. MERCIER.